(12) United States Patent
Schon et al.

(10) Patent No.: US 10,902,113 B2
(45) Date of Patent: Jan. 26, 2021

(54) DATA PROCESSING

(71) Applicant: ARM Limited, Cambridge (GB)

(72) Inventors: Guillaume Schon, Antibes (FR); Frederic Jean Denis Arsanto, Le Rouret (FR); Carlo Dario Fanara, Antibes (FR); Jocelyn François Orion Jaubert, Antibes (FR)

(73) Assignee: ARM Limited, Cambridge (GB)

( * ) Notice: Subject to any disclaimer, the term of this patent is extended or adjusted under 35 U.S.C. 154(b) by 119 days.

(21) Appl. No.: 15/793,186

(22) Filed: Oct. 25, 2017

(65) Prior Publication Data

US 2019/0121967 A1  Apr. 25, 2019

(51) Int. Cl.
| | |
|---|---|
| *H04L 29/06* | (2006.01) |
| *G06F 21/55* | (2013.01) |
| *G06F 9/30* | (2018.01) |
| *G06F 21/75* | (2013.01) |
| *G06F 11/30* | (2006.01) |

(52) U.S. Cl.
CPC ............ *G06F 21/55* (2013.01); *G06F 9/3016* (2013.01); *G06F 9/30098* (2013.01); *G06F 21/755* (2017.08); *G06F 11/3062* (2013.01)

(58) Field of Classification Search
CPC .................................. H04L 12/00; G06F 9/00
See application file for complete search history.

(56) References Cited

U.S. PATENT DOCUMENTS

| | | | | |
|---|---|---|---|---|
| 2012/0167114 | A1* | 6/2012 | Morishita | G06F 9/3851 718/107 |
| 2015/0074159 | A1* | 3/2015 | Poschmann | G09C 1/00 708/270 |

\* cited by examiner

*Primary Examiner* — Joseph P Hirl
*Assistant Examiner* — Leynna Truvan
(74) *Attorney, Agent, or Firm* — Nixon & Vanderhye, P.C.

(57) ABSTRACT

Data processing circuitry comprises a set of two or more computational units to perform respective computational operations; an instruction decoder to decode successive data processing instructions and, for a given data processing instruction, to control one or more of the computational units to perform those computational operations required to execute the given data processing instruction; and control circuitry responsive to the given data processing instruction, to control one or more others of the computational units to perform further computational operations, other than the computational operations required to execute the given data processing instruction, during execution of the given data processing instruction.

12 Claims, 4 Drawing Sheets

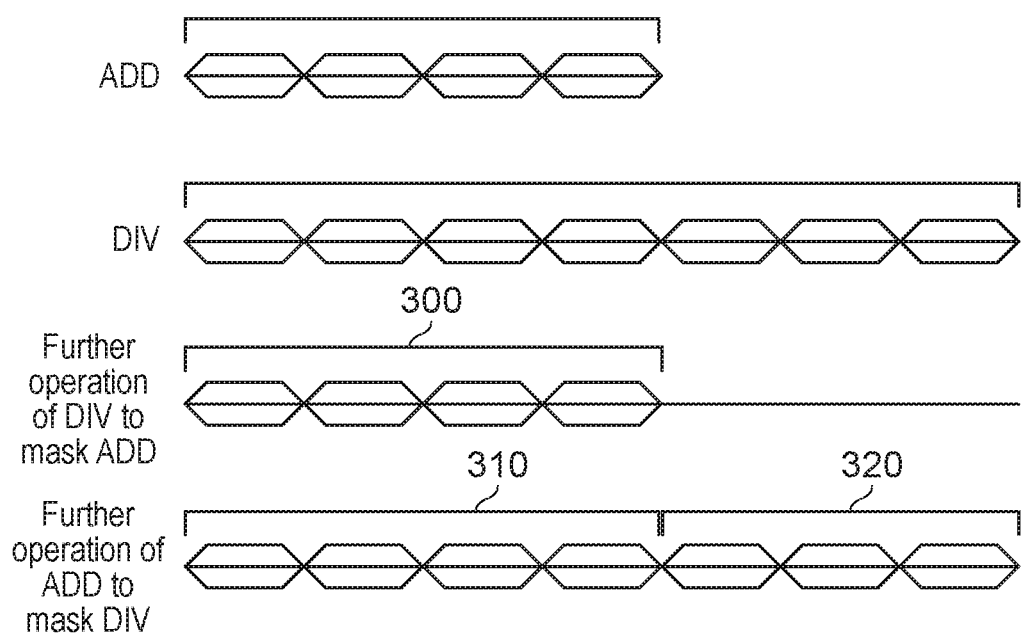

DATA PROCESSING

FIELD OF THE INVENTION

The present disclosure relates to the field of data processing.

BACKGROUND OF THE INVENTION

Keeping data secure and confidential during processing, such that the data and the processing of that data is not visible from the outside to an unauthorised observer, is a known problem in systems processing sensitive data. For example smart cards may store cryptographic keys that are used to encrypt confidential data that must not be accessible to a user.

It has been found that the use of techniques such as so-called differential power analysis or DPA of a system during its operation can provide data that may allow a person to determine information about the secure data such as the cryptographic keys stored within the system. Experimenters with DPA have observed that certain data processing operations, sometimes including their operands or output data, can be associated with characteristic variations in power consumption Various techniques have been devised to try to inhibit such attacks on the security of the system. It would be desirable to provide increased security within a system processing confidential data.

SUMMARY

In an example arrangement there is provided data processing circuitry comprising:

a set of two or more computational units to perform respective computational operations;

an instruction decoder to decode successive data processing instructions and, for a given data processing instruction, to control one or more of the computational units to perform those computational operations required to execute the given data processing instruction; and control circuitry responsive to the given data processing instruction, to control one or more others of the computational units to perform further computational operations, other than the computational operations required to execute the given data processing instruction, during execution of the given data processing instruction.

In another example arrangement there is provided data processing circuitry comprising:

a set of two or more computational means for performing respective computational operations;

means for decoding successive data processing instructions and, for a given data processing instruction, for controlling one or more of the computational means to perform those computational operations required to execute the given data processing instruction; and control means responsive to the given data processing instruction, for controlling one or more others of the computational means to perform further computational operations, other than the computational operations required to execute the given data processing instruction, during execution of the given data processing instruction.

In another example arrangement there is provided a method of operation of data processing circuitry having a set of two or more computational units for performing respective computational operations, the method comprising;

decoding successive data processing instructions;

for a given data processing instruction, controlling one or more of the computational units to perform those computational operations required to execute the given data processing instruction; and in response to the given data processing instruction, controlling one or more others of the computational units to perform further computational operations, other than the computational operations required to execute the given data processing instruction, during execution of the given data processing instruction.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which:

FIG. 2 provides a schematic example of configuration data;

FIG. 3 is a schematic timing diagram;

DESCRIPTION OF EMBODIMENTS

Figure 1:
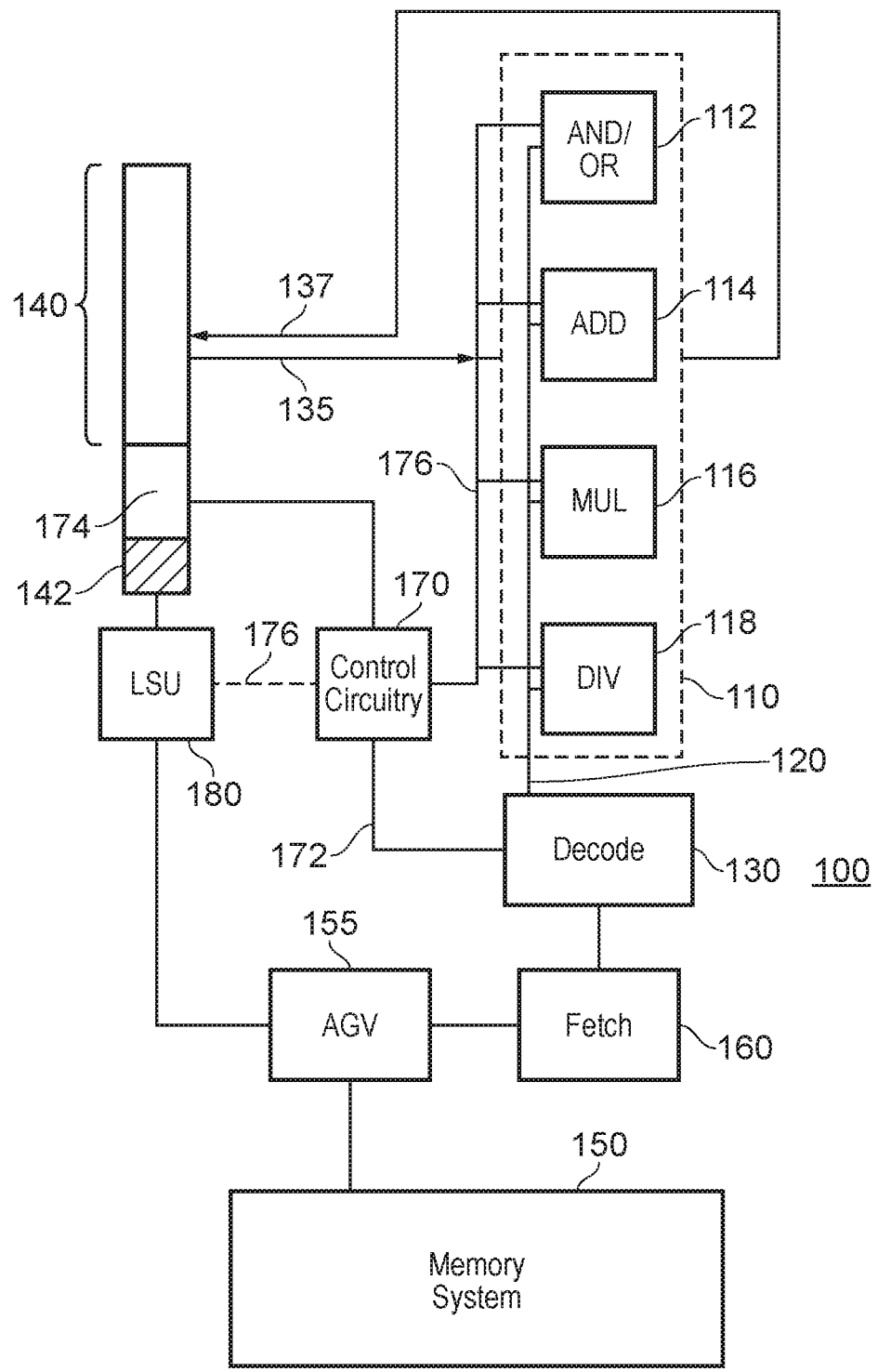
FIG. 1 schematically illustrates data processing circuitry.

Before discussing the embodiments with reference to the accompanying figures, the following description of embodiments is provided.

An example embodiment provides data processing circuitry comprising:

a set of two or more computational units to perform respective computational operations;

an instruction decoder to decode successive data processing instructions and, for a given data processing instruction, to control one or more of the computational units to perform those computational operations required to execute the given data processing instruction; and control circuitry responsive to the given data processing instruction, to control one or more others of the computational units to perform further computational operations, other than the computational operations required to execute the given data processing instruction, during execution of the given data processing instruction.

Embodiments of the present disclosure address the problems discussed above of data processing operations potentially being vulnerable to DPA, by providing for the concurrent operation of one or more computational units other than the one (or ones) required for execution of a currently executed instruction. For example, the further computational operations may be operations not required to execute the given data processing instruction. This can serve to mask the DPA characteristics of the actually-executing computational operations, by concurrently performing unneeded or "dummy" computational operations using one or more other computational units.

In some examples, the circuitry comprises a set of two or more data processing registers to provide inputs to and receive outputs from the computational units for execution of data processing instructions; and one or more further data processing registers; the control circuitry being configured to selectively control the one or more others of the computational units to store a result of a further computational operation in the one or more further data processing registers. In examples arrangements, operation of a computational unit may lead to the generation of output or result data and a data storage operation. In example embodiments, this can be handled by using a further data processing register, not configured to provide an input for "real" data processing operations but allowing a "dummy" data read/write operation to be carried out so as to mimic the power consumption characteristic of a real data read/write operation.

The computational units may have associated execution periods, for example expressed as a number of clock cycles. The one or more other computational units may have longer or shorter execution periods than the actual operation being masked. If the one or more other computational units have a longer execution period, their operation can be terminated when the operation to be masked finishes. If the one or more other computational units have a shorter execution period, their operation can be extended (or multiple dummy operations, potentially by different computational units, can be carried out in series) so as to occupy the execution period of the actual computation unit. Therefore, in example arrangements the control circuitry is configured to control the one or more others of the computational units to perform the further computational operations until completion of execution of the given data processing instruction.

In some example, the control circuitry is responsive to a classification of the given data processing instruction to access configuration data defining, for each of a set of possible classifications of decoded data processing instructions, a respective group of one or more computational units to perform the further computational operations. The instruction decoder can itself generate the classification data for the given data processing instruction in response to decoding the given data processing instruction. The configuration data can, for example, represent a matrix of permutations of computational units used for executing a data processing instruction and the relevant one or more other computational units to mask its power signature, for example providing a mapping between each possible instance of the classification data and a respective set of one or more others of the computational units to perform the further computational operations.

The mapping can be varied, for example in response to a detection by the detector of the power signature of a certain operation, so as to better mask that operation (for example by changing or supplementing the further computational unit(s) for that operation). Or the mapping can be varied by the user under program control. Therefore, in some examples, the circuitry comprises a detector to detect power consumption by the data processing circuitry; in which the control circuitry is configured to vary the configuration data in response to the detected power consumption. In some examples, one or more data processing instructions are executable to vary the configuration data.

Conveniently, as part of its operation, the instruction decoder can generate the classification of the current instruction to be executed. In such examples, the instruction decoder is configured to generate the classification data for the given data processing instruction in response to decoding the given data processing instruction.

The configuration data may conveniently provide a mapping between each possible instance of the classification data and a respective set of one or more others of the computational units to perform the further computational operations.

In example arrangements, the computational units may comprise one or more of: an addition unit; a multiplication unit; a division unit; and a logical combination unit. In examples arrangements the computational units may comprise an address generation unit, in which the further computational operations include one or both of: write operations to a reserved area of memory; and read operations from memory.

Another example embodiment provides data processing circuitry comprising:

a set of two or more computational means for performing respective computational operations;

means for decoding successive data processing instructions and, for a given data processing instruction, for controlling one or more of the computational means to perform those computational operations required to execute the given data processing instruction; and control means responsive to the given data processing instruction, for controlling one or more others of the computational means to perform further computational operations, other than the computational operations required to execute the given data processing instruction, during execution of the given data processing instruction.

Another example embodiment provides a method of operation of data processing circuitry having a set of two or more computational units for performing respective computational operations, the method comprising;

decoding successive data processing instructions;

for a given data processing instruction, controlling one or more of the computational units to perform those computational operations required to execute the given data processing instruction; and in response to the given data processing instruction, controlling one or more others of the computational units to perform further computational operations, other than the computational operations required to execute the given data processing instruction, during execution of the given data processing instruction.

FIG. 1 schematically illustrates a data processing circuitry 100 comprising a set of two or more computational units (forming an arithmetic logic unit or ALU 110) to perform respective computational operations. The computational units in this example comprise: a logical combination unit such as an AND/OR unit 112, an adder unit 114, a multiplier unit 116 and a division unit 118. Other computational units could also be provided. Together, these represent examples of the set referred to as the ALU 110.

In operation, each computational unit operates under the control of control signals 120 from an instruction decoder 130 and carries out computational operations required to execute a data processing instruction decoded by the instruction decoder 130. The control signals can define the particular nature of a required operation, the inputs and outputs (such as register identifiers) and any other parameters. In carrying out the computational operations, typically the computational units receive input data 135 from a set of processing registers 140 and generate output data 137 to be written back to the processing registers 140.

The instruction decoder 130 receives instructions to be decoded from a memory system 150, the memory system 150 possibly including a main memory and optionally one or more levels of cache memory, accessed by addresses generated by an address generation unit 155. Fetch logic 160 uses these addresses and fetches instructions from the memory system 150 for decoding by the instruction decoder.

So, in summary, the instruction decoder is arranged to decode successive data processing instructions and, for a given data processing instruction, to control one or more of the computational units 110 to perform those computational operations required to execute the given data processing instruction.

Control circuitry 170 is also responsive to the given data processing instruction, and controls one or more others of the computational units 110 to perform further computational operations, other than the computation operations required to execute the given data processing instruction, during execution of the given data processing instruction.

One reason to perform such further computational operations is to aim to mask, at least in part, a power consumption characteristic of the data processing circuitry.

In the context of secure operations, for example encryption operations or the like, it can be important to hide a secret data item or a secret operation from an external observer. The secret can be an algorithm but in many instances it is a data item such as an SSH key, a private PGP key or the like. Techniques used by an external observer such as differential power analysis (DPA) can in some circumstances provide a correlation between a detection of the instantaneous power consumption of the data processing circuitry and one or both of an algorithm being used and a data item being acted upon by the data processing circuitry. In the present disclosure, it is noted that the computational units 110 can tend to have characteristic power consumption features, such as features indicating the length of cycles of an operation and/or features dependent upon the data values being acted upon by an operation. In order to mask such features from a DPA attack, the control circuitry 170 controls one or more of the others computational units to perform further computational operations, other than the computational operations required to execute the given data processing instruction, during execution of the given data processing instruction. For example the further computational operations can be so-called dummy operations not actually required to execute the given data processing instruction. In this way, the power consumption characteristics of the data processing circuitry during execution of a particular data processing instruction can be masked by super posing the power consumption characteristics of another on or more of the computational units.

The control circuitry can be responsive to a classification of a current (given) data processing instruction. For example, the classification 172 can be provided by the instruction decoder 130. The classification may specify, for example, which one or more of the computational units 110 will be activated for the execution of the current (given) data processing instruction. The control circuitry 170 can access configuration data 174 defining, for each of a set of possible classifications of decoded data processing instructions, a respective group of one or more (other) computation units to perform the further computation operations. An example of the configuration data will be described below with reference to FIG. 2.

As mentioned above, the circuitry comprises a set of two or more data processing registers 140 to provide inputs to and receive outputs from the computational units for execution of data processing instructions. To assist in the power consumption masking operations discussed here, however, one or more further "dummy" data processing registers 142 are provided. The reason for the one or more further data processing registers is that at least some of the operations of the computational units 110 which may be initiated in the context of the further (dummy) computational operations discussed above, can lead to the generation of an output data value. The storage of that output data value would form part of the normal power consumption characteristic of the computational unit but in the case of a dummy (further) computation operation, it is appropriate not to corrupt any of the "normal" data processing registers 140 by carrying out such a storage operation. The supply of input data to a dummy operation can be from a normal register (one of the registers 140) because the execution of the dummy operation would not corrupt the data held by the registers 140. But, when a dummy (further) computational operation is initiated by the control circuitry 170 and requires a destination to store its output, the control circuitry can selectively control the one or more others of the computational units to store a result of that further computation operation in the one or more further (dummy) data processing registers 142.

As mentioned above, examples of the computational units include the addition unit 114, the multiplication unit 116, the division unit 118 and the logical combination unit 112. A further example of a computational unit is a load/store unit 180 controlling data read and/or write accesses to and from the memory system 150, apart from those controlled by the fetch unit 160. In the context of the present operations, the one or more further computational operations can include one or both of write operations to a reserved area of memory (so as not to corrupt other "useful" data stored in the memory) and read operations (which can be from anywhere in the memory space). As mentioned above, the addressing is handled by the address generation unit (AGU) 155. In the present example, the fact that the AGU 155 is separate from the ALU 110 allows for the useful (from the point of view of masking operations by the ALU) generation of power consumption by the AGU independently of operations of the computational units in the ALU 110.

FIG. 2 is a schematic example illustrating the configuration data 174 accessed by the control circuitry. As mentioned above, this defines, for each of a set of possible classifications of a decoded data processing instruction (such as classifications 200 defining example computational operations involved in the normal execution of the data processing instruction), a respective group of one or more computational units 210 to perform the further computational operations.

It will be seen that the leading diagonal of the table of FIG. 2 has null entries because if a current data processing instruction is characterised as requiring (for example) the use of the adder unit 114, the adder unit cannot therefore be classified as a further computational unit to perform a dummy or further computational operation. However, other ones of the computational units not required for the execution of the current data processing execution can be classified as further computational units.

In the example of FIG. 2, a tick indicates the use of a computational unit as a further computational unit in the present context. So, for example, during execution of a data processing instruction by the logic combination 112, the further computational units may be the multiplier unit 116 or the LSU 180 to perform a read/write operation.

Therefore, in response to receipt of the classification information 172 from the instruction decode 130 the control circuitry 170 consults the configuration data 174 and generates control signals 176 to control operations of the computational units to execute dummy computational operations.

Techniques for establishing the configuration data of FIG. 2 will be discussed below.

FIG. 3 is a schematic timing diagram illustrating aspects of timing of the operations discussed above.

As noted earlier, normal operations of the various computational units can take different lengths of time, for example measured in numbers of cycles of a clock signal. The top line of FIG. 3 schematically illustrates that a normal operation of the adder unit 114 may take (purely as a schematic example) four clock cycles, and the second line schematically illustrates that a normal operation of the division unit 118 may take (again purely schematically) seven clock cycles.

For the purposes of masking the power characteristics of computation operations by the computational units, the control circuitry 170 is configured to control the other computational units to perform further computational operations until completion of execution of the given (current) data processing construction. So, if, for example, the configuration data of FIG. 2 were to specify that during execution of an add operation by the adder unit 114, further (dummy) computational operations should be carried out by the division unit 118, such operations are maintained in this embodiment only for the duration 300 of processing of the add operation. In this context, the further or dummy operation of the division unit 118 does not complete.

The lowest line of FIG. 3 gives an example of masking the operation of the division unit which normally takes seven clock cycles, by further (dummy) computational operations by the add unit 114. Here, the normal duration of the add operation is four clock cycles but seven clock cycles must be masked in order to disguise the entire operation of the division unit 118. To achieve this, the control circuitry 170 can control the add unit 114 to execute a first operation 310 lasting four clock cycles and then to control either the add unit or indeed another unit to perform a subsequent operation 320 lasting three clock cycles. In this way, in example embodiments, the control circuitry is configured to control the one or more others of computational units to perform the further computational operations until completion of execution of given data processing instruction.

Two techniques for establishing and/or modifying the configuration data of FIG. 2 will now be discussed with reference to FIGS. 4 and 5. In a first technique, the configuration data 14 can be written to by one or more data processing instructions which are executable to vary the configuration data, in a similar way as writing data to other registers 140. Therefore, the configuration data is under user (program) control. For example, the configuration data can be set so that the data processing circuitry performs masking during particularly sensitive operations, but can be set so as not to provide masking at other times.

Figure 4:
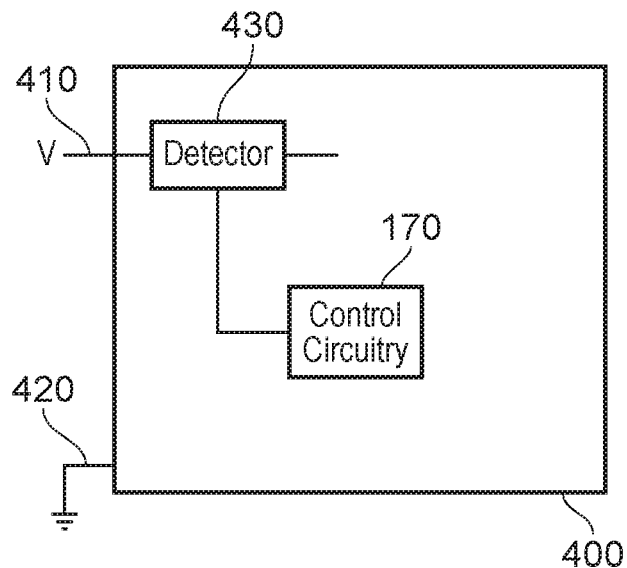
FIG. 4 schematically illustrates a power detector.

In another possible arrangement, FIG. 4 schematically illustrates a representation 400 of the data processing circuitry discussed above, which is provided with a power supply (V) 410 with respect to a ground connection 420. A detector 430 is arranged to detect power consumption by the data processing circuitry. The control circuitry 170 receives information from the detector 430 and is configured to vary the configuration data of FIG. 2 in response to the detected power consumption.

Figure 5:
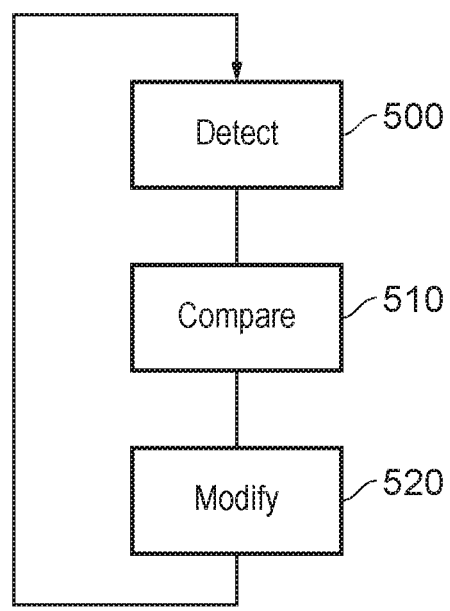
FIGS. 5 and 6 are schematic flowcharts illustrating respective methods.

This mode of operation is represented by a schematic flowchart of FIG. 5 in which, at a step 500 the detector 430 detects one or more characteristics of the prevailing power consumption of the circuitry 400 and, at a step 510 compares the characteristics with a desired characteristic. For example, the desired characteristic may be a constant or "flat" power consumption, or the desired characteristic may be a characteristic which the detector 430 is not able to correlate with known characteristics of individual computational units. In response to the comparison, the detector 430 indicates to the control circuitry at a step 520 to modify the configuration data or FIG. 2 if appropriate in order to move closer to the desired power consumption characteristic. The process may then be repeated by returning to the process 500.

Figure 6:
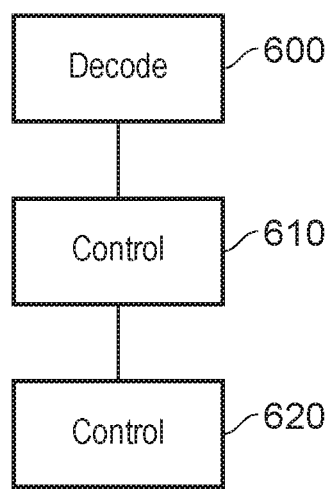

Finally, FIG. 6 is a schematic flowchart illustrating a method of operation of data processing circuitry having a set of two or more computational units for performing respective computational operations, the method comprising;

decoding (at a step 600) successive data processing instructions;

for a given data processing instruction, controlling (at a step 610) one or more of the computational units to perform those computational operations required to execute the given data processing instruction; and in response to the given data processing instruction, controlling (at a step 620) one or more others of the computational units to perform further computational operations, other than the computational operations required to execute the given data processing instruction, during execution of the given data processing instruction.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as a processing element as discussed above) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. A data processing circuitry comprising:
   a set of two or more computational units to perform respective computational operations;
   an instruction decoder to decode successive data processing instructions and, for a given data processing instruction, to control one or more of the computational units to perform those computational operations required to execute the given data processing instruction; and
   control circuitry responsive to the given data processing instruction, to mask a power consumption characteristic of the data processing circuitry during execution of the given data processing instruction by controlling one or more others of the computational units to perform further computational operations, other than the computational operations required to execute the given data processing instruction, during execution of the given data processing instruction and thereby superposing the power consumption characteristics of said one or more others of the computational units on the power consumption characteristic of the data processing circuitry, in which the control circuitry is responsive to a classification of the given data processing instruction to access configuration data defining, for each of a set of possible classifications of decoded data processing instructions, a respective group of one or more computational units to perform the further computational operations.

2. The data processing circuitry according to claim 1, comprising:
a set of two or more data processing registers to provide inputs to and receive outputs from the computational units for execution of data processing instructions; and
one or more further data processing registers;
the control circuitry being configured to selectively control the one or more others of the computational units to store a result of a further computational operation in the one or more further data processing registers.

3. The data processing circuitry according to claim 1, in which the control circuitry is configured to control the one or more others of the computational units to perform the further computational operations until completion of execution of the given data processing instruction.

4. The data processing circuitry according to claim 1, comprising:
a detector to detect power consumption by the data processing circuitry;
in which the control circuitry is configured to vary the configuration data in response to the detected power consumption.

5. The data processing circuitry according to claim 1, in which one or more data processing instructions are executable to vary the configuration data.

6. The data processing circuitry according to claim 1, in which the instruction decoder is configured to generate the classification data for the given data processing instruction in response to decoding the given data processing instruction.

7. The data processing circuitry according to claim 6, in which the configuration data provides a mapping between each possible instance of the classification data and a respective set of one or more others of the computational units to perform the further computational operations.

8. The data processing circuitry according to claim 1, in which the further computational operations are operations not required to execute the given data processing instruction.

9. The data processing circuitry according to claim 1, in which the computational units comprise one or more of:
an addition unit;
a multiplication unit;
a division unit; and
a logical combination unit.

10. The data processing circuitry according to claim 1, in which the computational units comprise an address generation unit, and in which the further computational operations include one or both of:
write operations to a reserved area of memory; and
read operations from memory.

11. A data processing circuitry comprising:
a set of two or more computational means for performing respective computational operations;
means for decoding successive data processing instructions and, for a given data processing instruction, for controlling one or more of the computational means to perform those computational operations required to execute the given data processing instruction; an
control means responsive to the given data processing instruction, for masking a power consumption characteristic of the data processing circuitry during execution of the given data processing instruction by controlling one or more others of the computational means to perform further computational operations, other than the computational operations required to execute the given data processing instruction, during execution of the given data processing instruction and thereby superposing the power consumption characteristic of the data processing circuitry, in which the control means is responsive to a classification of the given data processing instruction to access configuration data defining, for each of a set of possible classifications of decoded data processing instructions, a respective group of one or more computational units to perform the further computational operations.

12. A method of operation of data processing circuitry having a set of two or more computational units for performing respective computational operations, the method comprising;
decoding successive data processing instructions;
for a given data processing instruction, controlling one or more of the computational units to perform those computational operations required to execute the given data processing instruction; and
in response to the given data processing instruction, masking a power consumption characteristic of the data processing circuitry during execution of the given data processing instruction by controlling one or more others of the computational units to perform further computational operations, other than the computational operations required to execute the given data processing instruction, during execution of the given data processing instruction and thereby superposing the power consumption characteristics of said one or more others of the computational units on the power consumption characteristic of the data processing circuitry;
in which the controlling comprises, in responsive to a classification of the given data processing instruction, accessing configuration data defining, for each of a set of possible classifications of decoded data processing instructions, a respective group of one or more computational units to perform the further computational operations.

* * * * *